Sept. 15, 1936. O. ZIMMER Re. 20,113
CORNER HOLDER
Original Filed Feb. 16, 1931
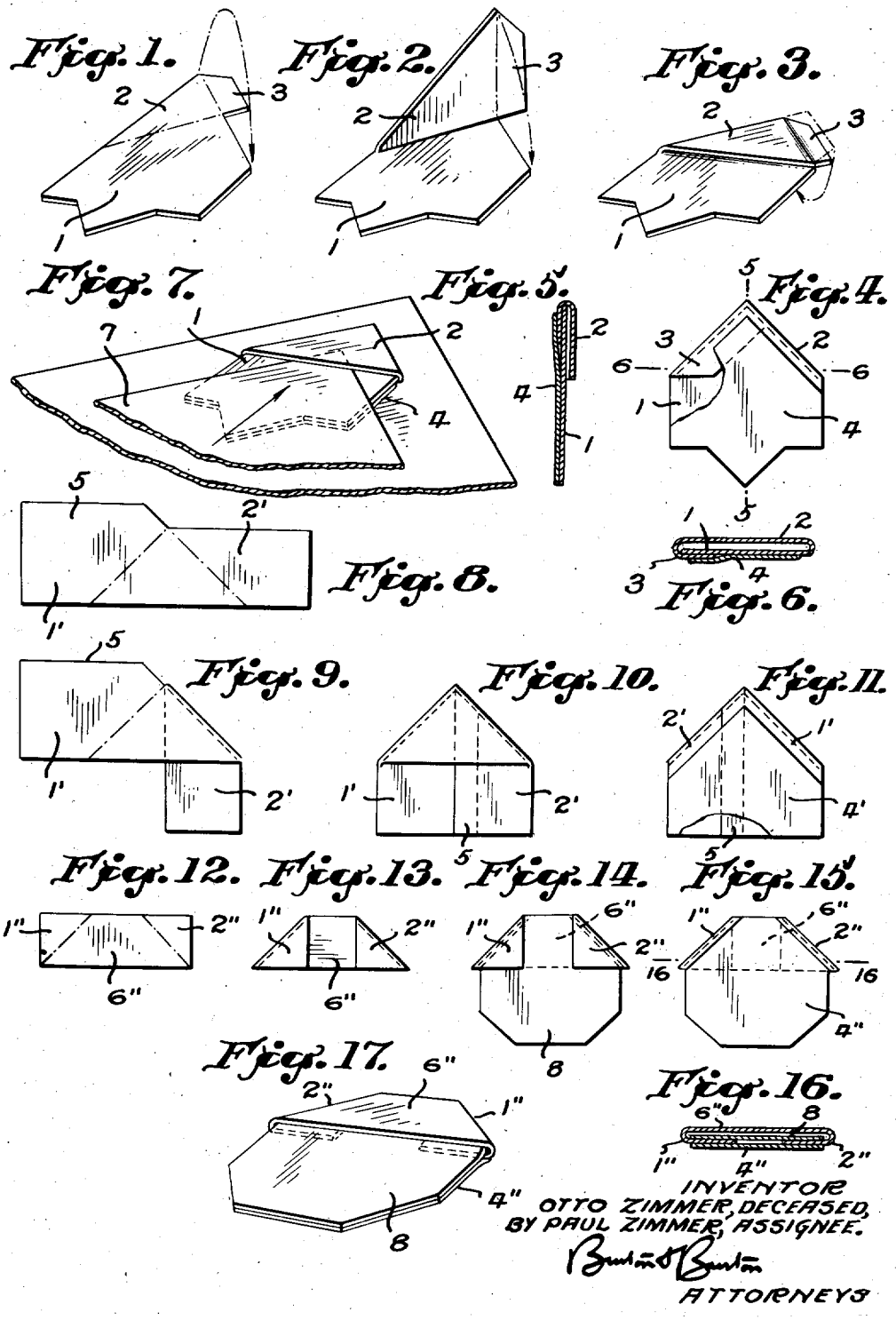
INVENTOR
OTTO ZIMMER, DECEASED,
BY PAUL ZIMMER, ASSIGNEE.
Burton & Burton
ATTORNEYS Reissued Sept. 15, 1936 Re. 20,113

UNITED STATES PATENT OFFICE 20,113

CORNER HOLDER

Otto Zimmer, deceased, late of Gladbach-Rheydt, Germany, by Paul Zimmer, assignee, Gladbach-Rheydt, Germany Original No. 1,895,599, dated January 31, 1933, Serial No. 516,075, February 16, 1931. In Germany February 13, 1930. Application for reissue June 18, 1934, Serial No. 731,157

10 Claims. (Cl. 40—158)

This invention has reference to so-called corner holders for paper and card-board articles, fancy stationery, photographs and the like and it is intended to simplify the construction and manufacture of such articles and to facilitate the attachment of these holders or fasteners to the object or article to be exhibited or stored. It is one of the main objects of such corner holders to so secure the stationery, photograph or similar article in such a manner that the fastening device is not readily detected and does not mar the appearance of such articles and in view thereof it has been common to manufacture such corner holders or pockets from transparent, pliable material, such as celluloid, "cellophane" or similar transparent, pliable, and more or less plastic, mostly organic sheet-like material. It has been difficult however to so construct the devices of the kind referred to as to cause them to securely retain the particular articles and to at the same time admit of their being readily introduced into the pocket-like cavity of the holder, inasmuch as the retaining means usually interfered more or less with the facility of introduction.

Now in accordance with this invention an improved and highly practicable article of the general description referred to is obtained from preferably transparent sheet-like material by applying thereto a specially gummed flap or the like which at the same time serves for the securing together of the folded-up sections of the sheet of material from which the device is manufactured and which is so arranged that it is protected from injury by a protruding edge of the device itself. Thus it does not become visible and does not mar or interfere with the appearance of the holding device and of the article to be retained thereby.

The invention will be described with reference to the accompanying drawing showing by way of exemplification several embodiments of the principles of this invention without restricting the invention to these particular kinds of structural realization of its principles. Figs. 1–3 show a sheet of flexible or pliable material in various stages of manufacture of the device. Fig. 4 is a rear view of the device in the finished condition. Fig. 5 is a vertical section on the line 5—5 of Fig. 4 and Fig. 6 is a vertical section on the line 6—6 of Fig. 4. Fig. 7 illustrates the introduction and mode of attachment of a card or photograph in connection with the device. Figs. 8–10 represent a modification in different stages of folding or manufacture and Fig. 11 is a back view of the finished article in accordance with Figs. 8–10 and corresponding with Fig. 4. Another modified construction is shown in Figs. 12 and 13. Figs. 14 and 15 show the combination with the back sheet in front view and back view respectively and Fig. 16 is a section on the line 16—16 of Fig. 15. Fig. 17 is a perspective view of the finished article.

While the invention is not restricted to the use of transparent or translucent material, I prefer for most of its uses and purposes to employ transparent material, particularly the various transparent derivatives of cellulose-esters, as for instance the nitrified products known under the trade names celluloid, "cellophane" or the acetic esters thereof, so-called glass-paper and equivalent articles. A sheet 1 of this or equivalent material is provided with one or more upstanding flaps, 2, 3 which may be separated from the bulk of the sheet by lines or scoring or the like, though I wish to point out that this is not absolutely necessary and such lines of separation may be dispensed with or may be obtained in any other manner. In Fig. 2 the flaps are shown in the erected position. Very often only one flap 2 will be sufficient. These flaps are folded down as appear from Fig. 3 of the drawing. This figure also illustrates the use of a single flap 2. The projecting part thereof which is indicated in dotted lines is folded back as appears from Figs. 3 and 4 of the drawing; or the two adjacent edges of the sheet of material or the corresponding flaps, 2, 3 may be folded up as appears from the sectional views of Figs. 5 and 6. The flap 3 is connected to the body portion 1 by the usual cement or by means of a softening agent, such as amyl-acetate or some other suitable solvent and is secured in position in the usual manner. On the back side of the pocket-like device thus obtained a piece of paper 4 or the like is pasted which may be colored or the like and which is provided on one or both sides with a suitable adhesive by means of which the corner holder may be secured in position upon a mounting card or upon the page of an album or other support.

This piece of paper or the like 4, as appears from Figs. 4, 5 and 6 terminates somewhat short of the edges of the pocket-like device, so that the edges of the folded sections will protrude beyond the edges of the paper, thereby protecting the paper against being injured by contact with other objects, by the fingers of the user or by other causes. Even if somewhat lacerated the unsightly edges of the sheet will not show to the outside and the pretty appearance of the article will not be interfered with. Besides, the protruding edge will also prevent the peeling off of the piece of paper, and there is the additional advantage that in the case of transparent material being used the protruding transparent edges prevent the paper or the like, when the article is inserted into the socket, from being seen. It is obvious that instead of paper equivalent material, such as textile material for instance, may be used.

In Fig. 7, I have shown diagrammatically the manner of introducing a card or the like 7 into the pocket obtained according to this invention.

A structural modification is shown in Figs. 8 to 11. The two lateral flaps 1′ and 2′ of the piece of material are folded down as appears from Figs. 9 and 10 and preferably in such a manner that the edge 5 of one of the flaps will overlap. The piece of paper or the like 4′ is attached in the manner described with reference to Figs. 4–6 of the drawing.

Another modification is shown in Figs. 12–17 of the drawing. With this arrangement the two side flaps 1″ and 2″ occupy only the extreme lateral sections of the piece or strip of material leaving a preferably unfolded intermediate section 6″ between them. In this case the sheet of paper 6″ is protected by the turned-over edges of the corner pieces 1″, 2″. In this modification an additional sheet 8, of celluloid, paper or the like may be inserted in the pocket formed by the folding of the edges 1″, 2″ and may be secured thereto by a suitable adhesive. This sheet 8 serves for the purpose of holding the turned-over corners in the folded position. In this modification in which the edges are folded upon themselves two sheets are secured to the corners both at the inside as well as at the outside thereof. The two sheets may be pasted together or they may be left separate.

The article to be retained or to be exhibited is very easily introduced into the pocket provided by the folded up structure and without any friction from the paper or the like inasmuch as the smooth inside walls of the corners and of the pocket are not interfered with and the paper 4 or the like is at the outside thereof. It should of course be understood that the device is susceptible of various other modifications and alterations and without thereby deviating from the scope and spirit of the appended claims.

What is claimed:

1. Corner holder, comprising in combination, a trapezoid-shaped pocket formed of a rectangular piece of transparent and flexible material, two corners of said piece being bent over, and a sheet inserted within said pocket and attached to the interior surfaces of the bent portions of said piece, said sheet having the shape of a polygon having two sides coinciding with the lines along which said piece was bent.

2. A corner pocket mounting device composed of a piece of transparent sheet material having two edges at right angles along which the material is folded upon itself providing space for the insertion of the corner of a picture card or the like with its adjacent edges stopped by said folds, and with a portion of the transparent material overlying the face of the card, together with a backing sheet of paper or the like gummed for adhesive securement to the transparent material and to a mount.

3. A corner pocket of transparent sheet material having two edges at right angles with flaps of the material folded under the area adjacent said edges, and a backing sheet of paper or the like gummed on both sides with said flaps adhesively secured to one side of said backing sheet, the other side being adapted for securement to a mount.

4. A corner pocket mounting device composed of a piece of transparent sheet material having two edges at right angles along which the material is folded under itself, together with a sheet of gummed material adhesively attached to said folded-under portions of the transparent material to form the pocket providing space for the insertion of the corner of a picture card or the like with its adjacent edges stopped by said folds, and with an unbroken area of the transparent material overlying the face of the card, the two folded edges constituting two sides of said area, and the card being introduced by insertion under a third side, a portion of the pocket underlying the card being dimensioned to extend beyond said third side.

5. A corner pocket of sheet material having two edges at right angles with flaps of the material folded under said area adjacent said edges, and a backing sheet gummed on both sides with said flaps adhesively secured to one side of said sheet, the other side being exposed for securement to a mount.

6. A corner pocket mounting device composed of a piece of sheet material having two edges at right angles along which the material is folded under itself, providing space for the insertion of the corner of a picture card or the like with its adjacent edges stopped by said folds, and with a portion of said sheet material overlying the face of the card, together with a single backing sheet of paper or the like gummed on both sides for adhesive securement to the folded-under portions of the said sheet material and to a mount.

7. A corner pocket of transparent sheet material having two edges at right angles with flaps of the material folded under the area adjacent said edges, and a backing sheet of paper or the like gummed on both sides with said flaps adhesively secured to one side of said backing seat.

8. A corner pocket of transparent sheet material having two edges at right angles to each other with flaps of the material folded under the area adjacent said edges, and a backing sheet of paper or the like adhesively secured against the under sides of said flaps and gummed on its under side for securement to a mount; said backing sheet being applied to the flaps with two of its edges spaced back from the folded edges of the transparent material.

9. A corner pocket mounting device composed of a piece of transparent sheet material having two edges at right angles along which the material is folded under itself providing space for the insertion of the corner of a picture card or the like with its adjacent edges stopped by said folds and with a portion of the transparent material overlying the face of the card, together with a backing sheet inserted in the pocket and adhesively secured to the folded-under portions of the transparent material.

10. A corner pocket mounting device composed of a piece of transparent sheet material having two edges at right angles along which the material is folded under itself, together with a sheet of paper or the like adhesively attached to the interior surfaces of the folded-under portions of transparent material to form a pocket, providing a space for the insertion of the corner of a picture card or the like with its adjacent edges stopped by said folds and with an unbroken area of the transparent material overlying the face of the card, the two folded edges constituting two sides of said area and the card being introduced by insertion under a third side, a portion of the pocket underlying the card being dimensioned to extend beyond said third side.

PAUL ZIMMER,
*Assignee of Otto Zimmer, Deceased.*